United States Patent
Lu et al.

(10) Patent No.: US 11,052,848 B2
(45) Date of Patent: Jul. 6, 2021

(54) ENERGY ABSORBING DEVICE

(71) Applicant: City University of Hong Kong, Kowloon (HK)

(72) Inventors: Jian Lu, Kowloon (HK); Yuan Gao, North Point (HK); Tao Tang, Kowloon (HK); Lu Yao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 112 days.

(21) Appl. No.: 15/490,977

(22) Filed: Apr. 19, 2017

(65) Prior Publication Data

US 2018/0304841 A1   Oct. 25, 2018

(51) Int. Cl.
*B60R 19/34* (2006.01)

(52) U.S. Cl.
CPC .................. *B60R 19/34* (2013.01)

(58) Field of Classification Search
CPC ......... B60R 19/34; B60R 19/26; B60R 19/03; F16F 7/12; F16F 7/121

USPC ......... 293/133; 188/371, 376–377; 256/13.1, 256/14

See application file for complete search history.

(56) References Cited

U.S. PATENT DOCUMENTS

| 3,788,626 | A | * | 1/1974 | Isaacson | ................. B60R 19/26 293/135 |
| 4,413,856 | A | * | 11/1983 | McMahan | ............... B60R 19/26 293/110 |
| 2009/0134643 | A1 | * | 5/2009 | Alvarsson | ............... B60R 19/34 293/133 |
| 2015/0108775 | A1 | * | 4/2015 | Nakanishi | ............... B60R 19/34 293/133 |

\* cited by examiner

*Primary Examiner* — Stephen T Gordon
(74) *Attorney, Agent, or Firm* — Renner Kenner Greive Bobak Taylor & Weber

(57) ABSTRACT

An energy absorbing device includes a deformable elongate member that is arranged such that the device, in use, deforms in a controlled manner upon the absorption of impact energy. The invention also provides a chassis and a vehicle incorporating the energy absorbing device.

20 Claims, 5 Drawing Sheets

ENERGY ABSORBING DEVICE

TECHNICAL FIELD

The present invention relates generally to an energy absorbing device. Embodiments of the invention have application in the area of impact absorption in the event of a collision between two vehicles. A specific embodiment of the invention finds particular, but not exclusive, use in the provision of a crash box for installation on a motor vehicle chassis.

BACKGROUND ART

The ability of a structure to protect its occupants during an impact is one of the most important properties for the passive safety system on motor vehicles.

In modern vehicles, part of the energy absorbing structure utilised to protect occupants during an impact or collision is termed a "crash box". As the name implies, a crash box is a structure arranged to absorb kinetic energy in a controlled manner. The crash box is typically mounted between a vehicle's "bumper" and a longitudinal rail on the chassis of the vehicle.

Crash boxes are engineered such that, in a low-speed impact or collision, the crash box collapses and absorbs impact first, prior to other structural components in the vehicle absorbing the impact. In effect, the crash box converts the impact energy of the collision into deformation work to prevent or minimize the damage of the chassis of the vehicle.

By absorbing a substantive portion of the impact energy, less energy is transmitted into the vehicle cabin, and in turn, the energy imparted directly into passengers in the vehicle is also reduced. This absorption of energy therefore lowers the risk of the passenger injuries.

It follows that materials with excellent energy-absorption capability are preferred when designers and engineers seeks to design and manufacture a crash box. However, such materials can be expensive to produce and shape, may be heavy (thereby adding weight to the vehicle) and may have other issues, such as longevity issues.

It is with these shortcomings of the prior art in mind that embodiments of the present invention have been developed.

SUMMARY OF THE INVENTION

In a first aspect, the invention provides an energy absorbing device comprising a plurality of deformable elongate members shaped to absorb impact energy; and a container formed to control the absorption of impact energy by the plurality of deformable elongate members.

The plurality of deformable elongate members may be of variable lengths and/or of variable thicknesses.

The length of the plurality of deformable elongate members may be uniformly distributed within a range of 40% to 80% the length of the container and/or the plurality of deformable elongate members may be shaped to form a gradient of 15 degrees below the vertical.

In one embodiment, the plurality of deformable elongate members and/or the container are comprised of at least a high ductile and high strength material. The 0.2% yield strength material characteristic of the container may be at least greater than or equal to 600 Mpa, but preferably is at least greater than or equal to 900 Mpa.

In one embodiment, the percent elongation material characteristic of the container is greater than or equal to 20% of the initial gauge length, but preferably is greater than or equal to 30% of the initial gauge length.

The container may be comprised of at least one of a polymer, an aluminium alloy and a magnesium alloy.

In one embodiment, the strength and ductility properties of the container are enhanced by at least one of a chemical process and a physical process. At least one of a chemical process and physical process may include at least one of a mechanical treatment, laser sintering, a temperature treatment, a pH changing treatment, solvent swelling, a magnetic technique, the application of an electric current, light and a chemical oxidation technique.

One or more of the plurality of deformable elongate members may be hollow and/or the thickness of the plurality of deformable elongate members may be approximately half the thickness of the container.

The container may have a transverse cross-section which is one of a polygon shape, an orbicular shape, a triangular shape, a frustum shape and a parallelogram shape In one embodiment, the device further comprises at least one of a first fastening plate and a second fastening plate, the plates being attached to a first end and a second end of the container, respectively. At least one of the first and second fastening plates may have a thickness 1.5-2.5 times greater than the thickness of the container. Moreover, at least one of the first and second fastening plate include cut-outs.

In a second aspect, the invention provides a chassis for a vehicle including an energy absorbing device in accordance with the first aspect of the invention, wherein the energy absorbing device is mounted between a bumper and a longitudinal rail of a vehicle.

In a third aspect, the invention provides a vehicle including a chassis in accordance with the second aspect of the invention.

BRIEF DESCRIPTION OF DRAWINGS

Notwithstanding any other forms which may fall within the scope of the present invention, a preferred embodiment will now be described, by way of example only, with reference to the accompanying drawings in which.

DESCRIPTION OF EMBODIMENTS OF THE INVENTION

Overview

Figure 1:
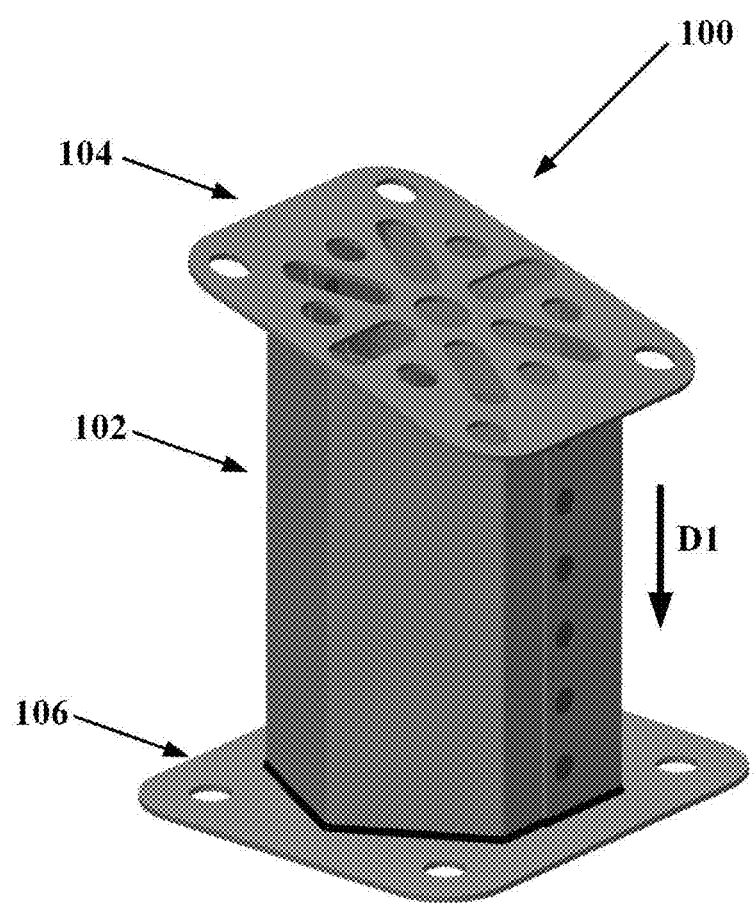
FIG. 1 is a basic perspective illustration of an energy absorbing device, in the form of a crash box, according to an embodiment of the present invention.

Throughout FIGS. 1 to 5, where the same or corresponding elements or features are shown in different figures, the same or corresponding elements or features are generally indicated using the same reference numerals.

Broadly, an embodiment of the invention is directed to a crash box mounted between a bumper and a longitudinal rail of a motor vehicle. The crash box embodiment includes a tube made of sheet steel which has a polygonal transverse cross section with one angled end, a front fastening plate welded to the angled end of the tube and constructed to connect the crash box to the bumper of the vehicle with bolt fasteners, and a rear fastening plate welded to the flat end of the tube and constructed to connect the crash box to the longitudinal rail with bolt fasteners.

According to one aspect of the present invention, a crash box mounted between a bumper beam and a longitudinal rail of a motor vehicle includes an outer tube with a polygonal transverse cross section, an inner circular tube inserts with different lengths held inside the outer tube, a frontal fastening plate welded to one end of the outer tube and constructed for connecting the crash box to the bumper beam with bolt fasteners, and a rear fastening plate weld to the other end of the outer tube and constructed for connecting the crash box to the longitudinal rail with bolt fasteners.

The outer tube is made of an Advanced High-Strength Steel (AHSS) or an Ultra High Strength Steel (UHSS) with good ductility properties. Various material treatment methods may be adopted on the tube to enhance the strength and ductility performance of the steel. The material treatment technologies may include mechanical treatments, laser sintering, temperature treatments, chemical treatments to change the pH of the steel, solvent swelling techniques, magnetic techniques, application of electric current, light and/or chemicals to induce oxidation, or any other suitable technique, as would be known to a person skilled in the art.

In the embodiment, a 0.2% yield strength of the outer tube of greater than or equal to 600 MPa is suitable, but a 0.2% yield strength of greater than or equal to 900 MPa is preferred. Additionally, an elongation of the outer tube material of greater than or equal to 20% is suitable, but an elongation of greater than or equal to 30% is preferred.

Crash Box

Referring now to FIG. 1, there is shown a perspective illustration of an energy absorbing device in the form of a crash box according to an embodiment of the present invention, generally designated by reference numeral 100. The crash box 100 is generally mounted between a vehicle bumper beam (not shown) and a longitudinal rail (also not shown) of a motor vehicle, so as to be used as an energy-absorption member in the event of impact. Arrow D1 designates the likely impact direction.

Figure 2:
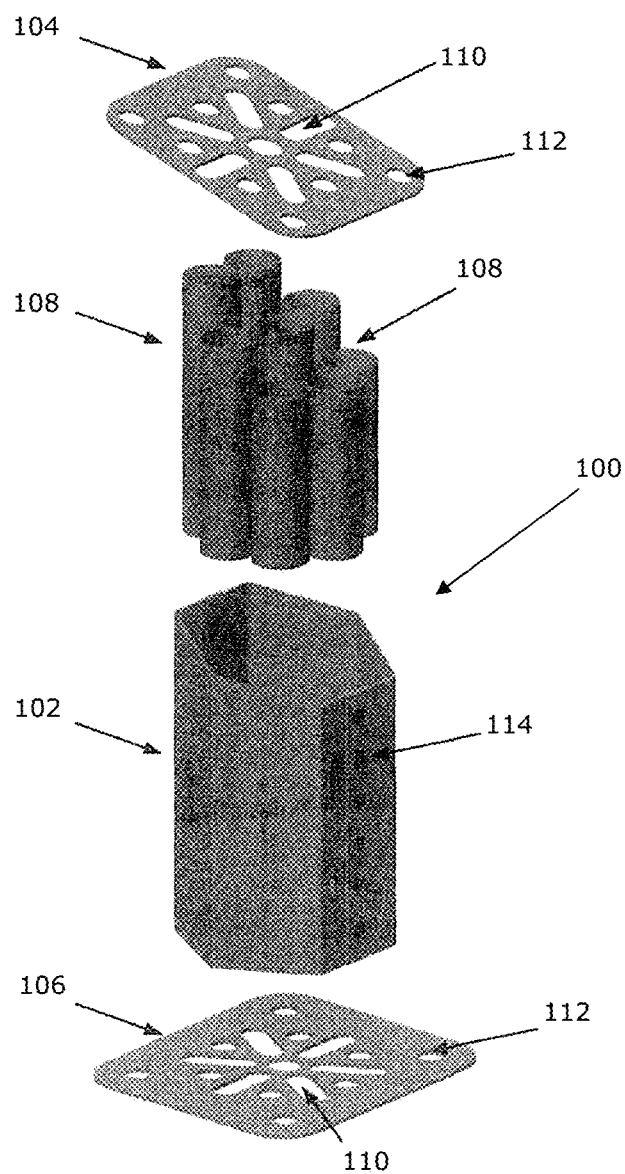
FIG. 2 is an exploded illustration of the crash box of FIG. 1.

Referring now to both FIGS. 1 and 2, in FIG. 2 there is shown an exploded illustration of the crash box 100, which includes an outer tube 102, a front fastening plate 104 and a rear fastening plate 106. The two fastening plates 104 and 106 are, in the embodiment illustrated, welded to the two proximal ends of the tubes. However, it will be understood that the two fastening plates 104 and 106 may be fastened utilising any suitable bonding technique that provides appropriate structural rigidity. This may include integrally forming the plates onto the outer tube, or utilising an adhesive, such as an epoxy adhesive. Alternatively, more conventional forms of bonding may be utilised, such as the use of rivets, bolts, etc.

Both the front and rear fastening plate 104 and 106, made of high strength stainless steel type 304, have a rectangular shape with four holes 108 near the four corners to allow the crash box 100 to be installed as described above. The holes 108 are sized to receive bolts and/or screws to join the crash box 100 to the bumper and longitudinal rail.

The frontal fastening plate 106 has a pattern of holes 110 in the central area of the plate to reduce the weight without substantively affecting the desired structural rigidity. The rear fastening plate 106 also has a pattern of holes 110 in the central area of the plate to reduce weight. The thickness of the two plates 104 and 106 are both set to be 2.0 mm (twice of the thickness of the tube 4) for strength and stiffness consideration.

The fastening plates are chamfered (as indicated by numeral 114) at the corners to save weight. Since the areas are designed to be larger than the enclosed areas by the proximal end profiles of the outer tube 102, the fastening plates 104 and 106 are directly welded to the outer tube 102 by use of a MIG welding technique.

The thickness of the plates may be larger (approximately 1.5 to 2.5 times) than the thickness of the tube so that the plates are strong enough to guarantee joint strength and avoid affecting the buckling of the tube in the event of impact. The plates, in the embodiment, are made of Advanced High-Strength Steel (AHSS) or Ultra High Strength Steel (UHSS).

The front and rear fastening plates have been described as having a rectangular shape with an area larger than the transverse cross-section area of the tube so that the plates may be directly joined to the proximal end of the tube, it will be understood that the plate may be any suitable shape to suit a specific application or vehicle design, including but not limited to a circular or polygonal shape.

Inner Tubes

Figure 3:
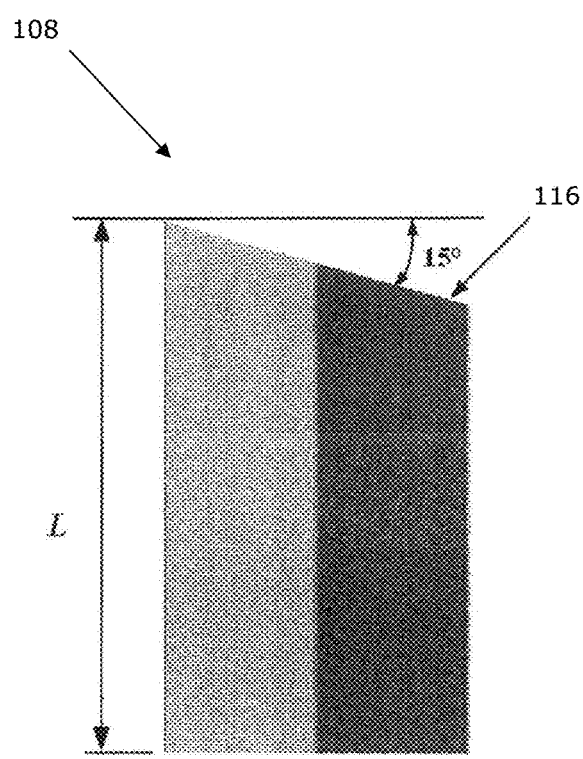
FIG. 3 is a side view of an outer portion of the crash box of FIG. 1.
Figure 4:
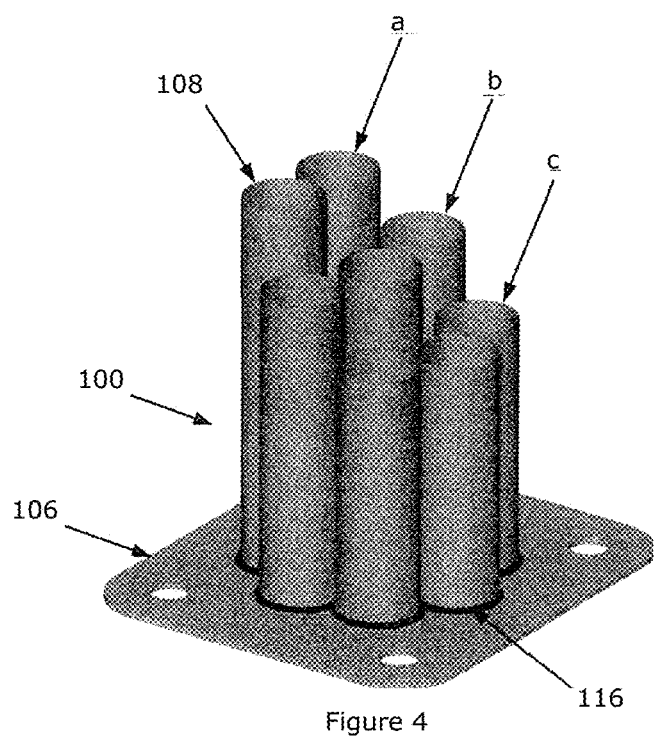
FIG. 4 is a perspective view of the crash box of FIG. 1 without the outer portion, to illustrate the inner portion.

Referring now to FIGS. 3 and 4, the eight inner circular tubes generally denoted by numeral 108 are made of high-strength stainless steel type 304 which has a 0.2% yield strength of 600 MPa and an elongation of 40%.

In the embodiment shown, all of the tubes have an outer diameter of approximately 26 mm and a thickness of approximately 0.5 mm (which, in the embodiment shown, is half the thickness of the outer tube 102), but as shown in FIG. 4, have three different lengths, namely, 2×120 mm (marked as 108a), 3×100 mm (marked as 108b) and 3×80 mm (marked as 108c), which result in a shaped (or sloped) inner set of tubes, which are sloped, in the embodiment, at 15°, as denoted by numeral 116.

Preferably, the outer-diameter of the inner tubes is approximately 40 to 70% of the side length of the outer tube. However, it will be understood that this value may be different depending on the materials utilised to construct the crash box, the overall dimensions of the crash box, the type of impact the crash box is designed to withstand, or any other suitable requirement, as would be obvious to a person skilled in the art.

As seen more clearly in FIG. 4, the ends of each of the eight inner tubes are welded on the rear fastening plate 106 by a MIG welding technique 116. By utilising different lengths of tubes, the differentiated heights cause both the outer tube 102 and the inner tubes, generally denoted by 108 to buckle in a stable and controlled manner in the event of an impact. Moreover, the addition of the inner tubes also serves to improve the energy-absorption of the crash box 100, as the impact load is spread across multiple tubes.

In the context of the present specification and of the embodiments and broader inventive concept described and defined herein, references to buckling occurring in a "stable manner" suggests that collapse (i.e. crumple deformation) of the tube or tubes occurs in a regular and repeatable by regular and repeated manner. That is, the tube or tubes collapse in a manner akin to the manner in which a bellows is closed. In contrast, unstable buckling would be considered to occur if the tube or tubes bent or buckled in an unrepeated manner during collapse.

Both the front fastening plate 104 and the rear fastening plate 106 are made of high-strength stainless steel type 304, have a rectangular shape with four holes 16 near the four corners for ease of installation reasons (the holes 16 being suited to receive bolts or screws to join the crash box 100 to the bumper and longitudinal rail on a vehicle, respectively.

Both the front fastening plate 104 and the rear fastening plate 106 have cut-out patterns 110 in the central areas to better direct the compression force applied on the inner tube pack in an impact, and also to reduce the weight of the plate. Both plates 104 and 106 have a thickness of approximately 2.0 mm (twice of the thickness of the outer tube 102) to provide additional strength and stiffness.

The fastening plates have chamfered corners 112 to save weight. As the plates are larger than the enclosed area defined by the respective proximal end profiles of the outer tube 102, fastening plates 104 and 106 are directly connected to the outer tube 102 by MIG welding.

Figure 5:
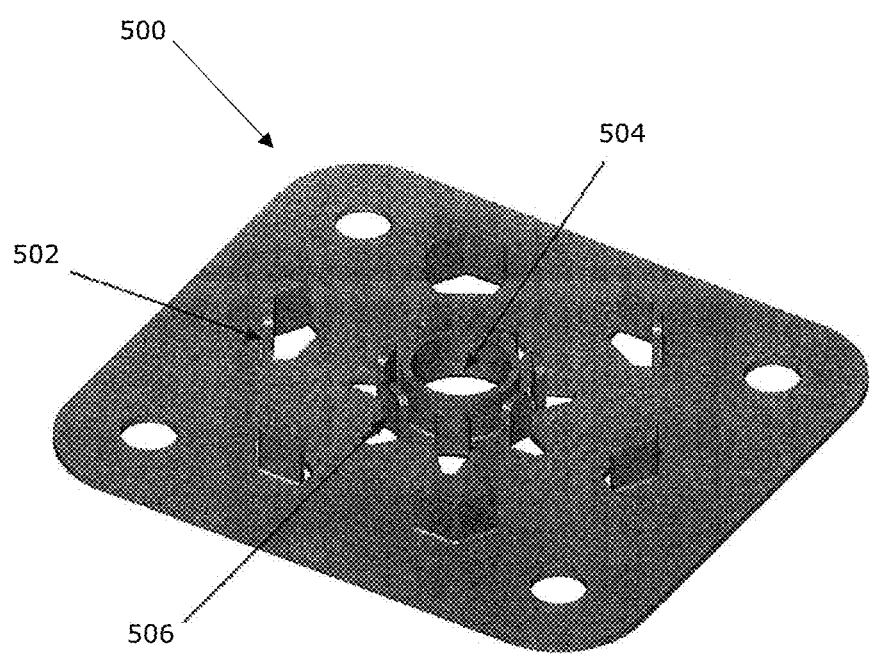
FIG. 5 is a perspective view of a fastening plate.

Referring now to FIG. 5, there is provided a perspective illustration of an alternative rear fastening plate, generally designated by numeral 500. This fastening plate differs from the plate 106 as it includes three different types of attachment portions. The six corner shape attachment portions 502 are utilised to fix the outer tube to the plate. The circle-shaped attachment portion 504 approximately in the centre of the plate is utilised to fix the central inner tube to the plate and the seven (7) curved attachment portions 506 surrounding the circle-shape attachment portion 504 are utilised to fix the seven (7) inner tubes to the plate. The attachment portions provide a higher joint strength under shear and tensile stress, in the case of side impact or towing.

The height of the attachment portion may be any suitable height for any suitable reason. For example, the height may be influenced by manufacturing constraints, such as spot welding limitations, but may also be influenced by other reasons, such as saving weight. In the illustrated embodiments, the outer tube, inner tube pack and the fastening plates are joined by using a MIG welding technique which results in join 114. It will be understood by a person skilled in the art that other joining techniques may also be utilised.

In a different embodiment, the tube may also incorporate separate reinforcing components (not shown) or a variation of the wall thickness of the tube as an alternate mechanism for creating areas of higher and lower strength. Such variations are within the purview of a person skilled in the art.

The inner tubes are described herein as having a circular transverse cross section. However, it will be understood that such a shape is chosen for convenience of manufacture, and the embodiment described herein is not intended to limit the broader inventive concept of the invention. It will be understood that alternative shapes, such as an octagon, a decagon or any other polygon may be utilized and, correspondingly, the manufacture process may also be altered to accommodate the formation of such shapes, such as by using extrusion or other known methods of forming shaped steel.

In an alternative embodiment, the inner and outer tube have a tapered shape where the ends widen at the end, in particular at the longitudinal rail proximal end. The tapered configuration enhances the side stiffness of the crash box and the crash box's ability to resist tensile force is also improved, for example during the towing of a motor vehicle.

Advantages

In the embodiment described, a number of inner tubes are located inside an outer tube. A single circular tube collapses and buckles in an unstable manner during axial impact, but a number of tubes (preferably six or more) with approximately identical outer diameter are packed parallel and inserted allows for controlled deformation and buckling.

As a single inner tube buckles, the radial deformation of the single tube body causes it to interact with other adjacent tubes, which acts as a constraint to further deformation of the tube. Put another way, the buckling deformation of each inner tubes is confined both by adjacent inner tubes and also by the internal space defined by the outer tube. This advantageously results in a more plastic buckling instead of Euler buckling.

Utilising different lengths of the tube allow the contact area between the impact mass and the crash box to increase in a gradual manner. Correspondingly, the reaction force applied to the crash box body (in an axial direction) during an impact increases smoothly while the probability of a collapse starting from a rear portion of the crash box is advantageously reduced.

It follows that slowing the transmission of forces results in a lower deceleration and a corresponding lower initial peak force applied to passengers in the vehicle, which advantageously reduces the risk of injury.

Moreover, the spread of the impact force across tubes of different length influences the buckling mode of the outer tube. Due to the synergistic interaction between the inner tubes and the outer tube, buckling occurs more stably.

In addition, by causing the tubes to buckled in a patterned manner, better utilisation of the material is made during plastic deformation which advantageously results in a higher energy absorption capability.

The use of patterned cut-outs in the centre area of both front and rear plates advantageously result in weight reduction and may be aesthetically appealing.

The thickness of the plates are larger than the thicknesses of the tubes, preferably 1.5-2.5 times larger, so that the plates have sufficient strength and stiffness to remain in shape and attached during buckling of both the inner and outer tubes in the event of an impact.

Disclaimers

It will be appreciated by persons skilled in the art that numerous variations and/or modifications may be made to the invention as shown in the specific embodiments without departing from the spirit or scope of the invention as broadly described.

It will also be appreciated that the embodiments of the invention as represented in the figures are not necessarily drawn to scale and moreover, that features of the embodiments may be illustrated by the use of graphic symbols, phantom lines, diagrammatic representations and fragmentary views.

Moreover, where a feature or detail would be obvious to a person skilled in the art and is not necessary for an understanding of the inventive aspect and/or features of an embodiment of the present invention, it will be appreciated that the feature may be omitted from the figures. The present embodiments are, therefore, to be considered in all respects as illustrative and not restrictive.

It will be understood that the crash box and the energy absorbing device described and defined herein may be manufactured in any suitable dimensions to suit particular applications and/or vehicles. Such variations are within the purview of a person skilled in the art.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. An energy absorbing device comprising a plurality of deformable elongate members shaped to absorb impact energy; and a container formed to control the absorption of impact energy by the plurality of deformable elongate members, each of the plurality of deformable elongate members having a length along an axial direction and a thickness, and the container having a length and a thickness, wherein at least one of the deformable elongate members has a different length than a length of another one of the deformable elongate members, wherein the deformable elongate members are packed parallel with each other, and wherein radial deformation of the deformable elongate members causes interaction with adjacent deformable elongate members which acts as a constraint to further deformation of the deformable elongate members in the direction transverse to the axial direction of the deformable elongate members, wherein the plurality of deformable elongate members are of variable thicknesses, and wherein the plurality of deformable elongate members are shaped to form a gradient of 15 degrees with respect to a maximum length of the container.

2. An energy absorbing device in accordance with claim 1, wherein the plurality of deformable elongate members are of variable lengths.

3. An energy absorbing device in accordance with claim 2, wherein the variable lengths of the plurality of deformable elongate members are within a range of 40% to 80% of the length of the container.

4. An energy absorbing device in accordance with claim 1, wherein the plurality of deformable elongate members are comprised of at least a high ductile and high strength material.

5. An energy absorbing device in accordance with claim 1, wherein the container has a 0.2% yield strength of greater than or equal to 600 Mpa.

6. An energy absorbing device in accordance with claim 5, wherein the container has a 0.2% yield strength of greater than or equal to 900 Mpa.

7. An energy absorbing device in accordance with claim 1, wherein the container has a percent elongation greater than or equal to 20%.

8. An energy absorbing device in accordance with claim 7, wherein the container has a percent elongation greater than or equal to 30%.

9. An energy absorbing device in accordance with claim 1, wherein the container is comprised of at least a high ductile and high strength material.

10. An energy absorbing device in accordance with claim 1, wherein the container is comprised of at least one of a polymer, an aluminium alloy and a magnesium alloy.

11. An energy absorbing device in accordance with claim 1, wherein strength and ductility properties of the container are enhanced by at least one of a chemical process and a physical process.

12. An energy absorbing device in accordance with claim 11, wherein the at least one of a chemical process and physical process includes at least one of a mechanical treatment, laser sintering, a temperature treatment, a pH changing treatment, solvent swelling, a magnetic technique, and the application of any one of electric current, light, and chemicals to induce oxidation.

13. An energy absorbing device in accordance with claim 1, wherein one or more of the plurality of deformable elongate members is hollow.

14. An energy absorbing device in accordance with claim 1, wherein the thickness of each of the plurality of deformable elongate members is half the thickness of the container.

15. An energy absorbing device in accordance with claim 1, wherein the container has a transverse cross-section which is one of a polygon shape, an orbicular shape, a triangular shape, a frustum shape and a parallelogram shape.

16. An energy absorbing device in accordance with claim 1, further comprising at least one of a first fastening plate and a second fastening plate, the plates being attached to a first end and a second end of the container, respectively.

17. An energy absorbing device in accordance with claim 16, wherein at least one of the first fastening plate and the second fastening plate has a thickness 1.5-2.5 times greater than the thickness of the container.

18. An energy absorbing device in accordance with claim 16, wherein at least one of the first fastening plate and the second fastening plate includes cut-outs.

19. A chassis for a vehicle including the energy absorbing device in accordance with claim 1, wherein the energy absorbing device is mounted between a bumper and a longitudinal rail of a vehicle.

20. A vehicle including the chassis in accordance with claim 19.

* * * * *